United States Patent Office 3,437,498
Patented Apr. 8, 1969

3,437,498
NOVEL DIALKENYL POLYSULFIDE-SULFUR COMPOSITIONS
Donald J. Martin, Irvington, N.Y., assignor to Stauffer Chemical Company, New York, N.Y., a corporation of Delaware
No Drawing. Filed July 20, 1966, Ser. No. 572,633
Int. Cl. C09d 3/66
U.S. Cl. 106—19    3 Claims

ABSTRACT OF THE DISCLOSURE

Plasticized sulfur compositions having improved impact resistance comprising the reaction product of elemental sulfur and an alkylene polysulfide of the formula $$R-S_n-R$$

wherein R is an alkenyl group of from 2 to 9 carbon atoms and $n$ is an integer of from 2 to 6 inclusive.

---

This invention relates to plasticized sulfur compositions, particularly suited for marking roads, highways and the like, which are characterized by having high impact resistance in addition to good hardness and durability properties. More specifically, this invention is concerned with plasticized sulfur compositions which are prepared by reacting a major amount of elemental sulfur and a minor amount of a dialkenyl polysulfide plasticizer.

Considerable research has been conducted on the utilization of sulfur compositions because they are generally inexpensive and resistant to attack by acids, penetration by roots, as well as resistant to the action of lubricating oils or gasoline. Accordingly, such compositions have been found useful for jointing brick, sewer pipe, segmental tile and sewer brick. Sulfur compositions have also found use as roadmarking materials because of their inherent strength, flexibility and resiliency, but despite the considerable market potential for successful plasticized roadmarking compositions, suitable plasticizers have been mainly limited to the alkylene tetrasulfides and specifically polyethylene tetrasulfide. One of the primary defects found with the polyalkylene tetrasulfides, and particularly polyethylene tetrasulfide, is the limited resistance to damage by impact which considerably limits their use for various applications. Moreover, as was found in a series of tests conducted at the Texas Engineering Experiment Station, Texas A. & M. College System, College Station, Tex., a sulfur traffic stripe utilizing the polyethylene tetrasulfide plasticizer was 42% destroyed after a period of eight weeks after application. To obtain an acceptable composition, it was necessary to use an auxiliary rosen plasticizer (Ind. and Eng. Chem., vol. 46, No. 11, pp. 2431–5).

It is accordingly the primary object of this invention to provide sulfur compositions which are resistant to impact.

It is another object of this invention to provide sulfur compositions suitable for marking roads, highways and other paved surfaces.

It is still another object of this invention to provide plasticized impact resistant sulfur compositions which are suitable for marking roads, highways and other paved surfaces, and which exhibit improved abrasion resistance.

Other objects will be apparent from the description which follows.

I have now discovered that dialkenyl polysulfide-sulfur compositions are unusually resistant to cracking by impact and, accordingly, are especially well suited for marking compositions and other applications where stress and abrasion has rendered the use of sulfur compositions impractical.

The dialkenyl polysulfide plasticizers utilized in my invention may be represented by the following formula:

$$R-S_n-R$$

wherein R is an alkenyl group of from 2 to 9 carbon atoms and $n$ is an integer of from 2 to 6 inclusive.

The above polysulfides are reacted with sulfur to plasticize same in a polysulfide-sulfur weight ratio of from 1:99 to 1:1 and preferably from 5:95 to 1:33. It is desirable to add a small amount of an alkaline material to aid in combining the reactants, but none is required. A variety of bases may be used, such as the alkali metal and alkaline earth metal carbonates and organic, primary, secondary and tertiary amines, but only a small amount is used, generally less than 1.5% by weight of the final composition.

Quite unexpectedly these compositions and particularly the diallyl tetrasulfide-sulfur compositions are unusually resistant to cracking by impact. For example, in testing for impact strength utilizing a Gardner impact tester, a diallyl tetrasulfide-sulfur composition is not fractured by the application of the maximum stress permitted by the tester, i.e. 30 inch-pounds, whereas the polyethylene tetrasulfide-sulfur composition has an average impact resistance of 4 inch-pounds and unplasticized sulfur an impact resistance of <2 inch-pounds.

To prepare the plasticized compositions, the sulfur may be first melted and then any fillers, dyes and pigments added with the polysulfide, but the order of addition is not critical and the materials may be dry-mixed prior to heating. Suitable inert fillers include silicates, glass beads (20- to 50-mesh), and the like which impart strength to the compositions as well as improve night visibility in the case of the glass beads. In preparing the compositions of the invention, the sulfur can be heated until in the molten state, i.e., from about 118° C. to about 250° C. It is preferable to maintain the temperature of the reaction mixture at about 150° C. since pure sulfur becomes viscous at 160° C. and higher temperatures raise the cost of processing. Since the compositions of the invention may be used in different applications, as well as in different geographical locations and under varying use conditions, the most suitable sulfur to plasticizer ratio can be easily determined by those skilled in the art by simple experimentation.

Various whiteners or pigments may be blended with the compositions when a light color is desired and one particularly effective pigment is titanium dioxide. Two excellent yellow pigments are Hansa Yellow (the coupling product between diazotized p-nitroaniline and acetoacetanilide), and toluidine Yellow (the coupling product between diazotized m-nitro-p-toluidine and acetoacetanilide).

To protect against bacterial attack that might result in deterioration and loss of bond to the pavement, a minor amount of a bactericide such as o-benzyl-p-chlorophenol, pentachlorophenol, or sodium pentachlorophenate can be added to the melt.

The paved surface, to which the plasticized composition is to be applied, should be swept free of any dirt. This composition or melt may then be applied by an applicator of the type used for applying paint, which has been adapted to permit maintaining the temperature of the melt at about 140° C. A stripe may easily be laid in any desired thickness and will set to harden in a fraction of the time required for traffic paints.

The dialkenyl polysulfide plasticizers of the invention can be prepared by the condensation of an alkenyl halide with an aqueous sodium polysulfide solution in a molar ratio of alkenyl halide to polysulfide of 2:1, according to the following equation:

$$2\ RCl + Na_2Sx \rightarrow (R)_2Sx + 2NaCl$$

The temperature of the exothermic reaction is preferably maintained below the boiling point of the alkenyl halide at a temperature between about 50° C. and 100° C. by external cooling and vigorous agitation. After the addition is complete, the reaction mixture is agitated for an aditional 2–4 hours while maintaining the temperature within the above temperature range. The reaction mixture is then allowed to cool to room temperature and extracted several times with an insert solvent such as carbon tetrachloride, benzene, or other suitable solvent. The combined extracts are dried, filtered and fractionally distilled to produce the dialkenyl polysulfide.

Examples of suitable polysulfides for reaction with the dialkenyl halide include: sodium disulfide, sodium trisulfide, sodium tetrasulfide, and sodium pentasulfide.

The following examples will serve to illustrate the invention but should not be construed as limiting for obvious modifications will be apparent to one having ordinary skill in the art. All parts and percentages in said examples are on a weight basis.

EXAMPLE 1

To a flask containing 150 ml. of water is added 120 gm. (0.5 mole) of sodium sulfide at room temperature. After the addition is complete, 58 gm. (1.5 moles) of elemental sulfur is slowly added and the mixture agitated for 2 hours at room temperature. To the resultant deep red solution is added 76.5 gm. (1.0 mole) of allyl chloride, dropwise, while maintaining the exothermic reaction below about 35° C. by means of a water bath and vigorous agitation. After the completion of the allyl chloride addition, which requires approximately 1 hour, the reaction mixture is agitated for an additional 2 hours at room temperature and 2 hours at 40° C. The reaction mixture is then allowed to cool to room temperature and extracted 3 times with chloroform, dried over sodium sulfate, filtered, and the filtrate stripped to give 101 gm. of a yellow liquid; $N_D^{25}=1.619$. This latter material is fractionally distilled at 10–15 mm. to give 34 gm. of a yellow liquid having a boiling point range of 94–99° C.

EXAMPLE 2

79 parts of commercial grade elemental sulfur in the molten state at a temperature of 135° C. is poured into a 250 cc. stainless steel beaker contained in a heating mantel. To this melt is added 20 parts of the reaction product of Example 1, 1 part of calcium carbonate and the melt is heated to 150° C., and maintained at this temperature for 30 minutes. The melt is poured into aluminum foil evaporating dishes approximately 2 inches in diameter and ½ inch high and allowed to cool to room temperature. The solid compositions are then tested for impact strength.

To test for impact strength, two samples of the plasticized compositions are subjected to the Gardner light duty impact tester, which consists of dropping a 1-pound ball on the sample from progressively higher heights until a cracking is noted on the reverse side of the sample. The two plasticized compositions are found to have an impact resistance of greater than 30 inch-pounds. Two unplasticized sulfur compositions heated to 150° C., and maintained at that temperature for 30 minutes, are also subjected to this test and found to have an impact resistance of less than 2 inch-pounds. Two polyethylene tetrasulfide plasticized compositions prepared by the method of this example are found to have an impact resistance of 4 inch-pounds.

EXAMPLE 3

89 parts of commercial grade elemental sulfur in the molten state at a temperature of 135° C. is poured into a 250 cc. stainless steel beaker contained in a heating mantel. To this melt is added 10 parts of the reaction product of Example 1, 1 part of calcium carbonate and the melt is heated to 150° C., and maintained at this temperature for 30 minutes. The melt is poured into aluminum foil evaporating dishes approximately 2 inches in diameter and ½ inch high and allowed to cool to room temperature. The solid compositions are then tested for impact strength and found to have an impact resistance of greater than 30 inch-pounds.

I claim:

1. A plasticized sulfur composition having improved impact resistance comprising the reaction product of elemental sulfur and an alkylene polysulfide of the formula:

$$R-S_n-R$$

wherein R is an alkenyl group of from 2 to 9 carbon atoms and $n$ is an integer of from 2 to 6 inclusive, in a ratio of sulfur to plasticizer of from 99:1 to 1:1% by weight.

2. The composition of claim 1 wherein the ratio of sulfur to plasticizer is from 95:5 to 33:1% by weight.

3. The composition of claim 1 wherein the polysulfide plasticizer is diallyl tetrasulfide and the sulfur to plasticizer ratio is from about 3:1 to about 12:1% by weight.

References Cited

UNITED STATES PATENTS

| 2,039,070 | 4/1936 | Duecker | 260—79.5 |
| 2,043,941 | 6/1936 | Williams | 260—609 |
| 3,020,252 | 2/1962 | Hancock | 260—30.8 |
| 2,237,625 | 4/1941 | Olin | 260—608 |

JULIUS FROME, *Primary Examiner.*

T. MORRIS, *Assistant Examiner.*

U.S. Cl. X.R.

106—70, 287; 260—608